B. BUZZARD & A. P. SNYDER.
Bee-Hive.

No. 203,321.　　　　　Patented May 7, 1878.

UNITED STATES PATENT OFFICE.

BENJAMIN BUZZARD AND ANDREW P. SNYDER, OF ASHLAND, OHIO, ASSIGNORS TO THEMSELVES AND SAMUEL LEAMAN, OF SAME PLACE.

IMPROVEMENT IN BEE-HIVES.

Specification forming part of Letters Patent No. 203,321, dated May 7, 1878; application filed October 30, 1877.

*To all whom it may concern:*

Figure 1:
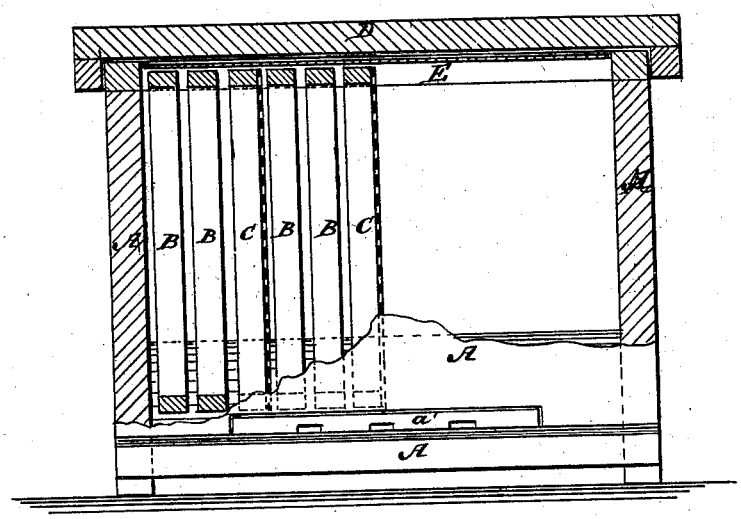
Figure 2:
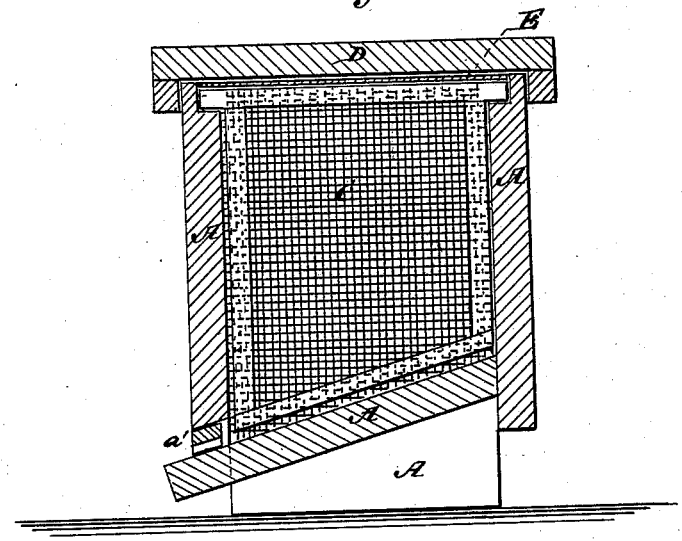

Be it known that we, BENJAMIN BUZZARD and ANDREW P. SNYDER, of Ashland, in the county of Ashland and State of Ohio, have invented a new and useful Improvement in Bee-Hives, of which the following is a specification:

Figure 1 is a front view of our improved bee-hive, partly in section to show the construction. Fig. 2 is a vertical cross-section of the same.

Similar letters of reference indicate corresponding parts.

The object of this invention is to furnish an improved bee-hive, called by us "The Bee-Palace," which shall be so constructed that two or more swarms may be put together or united, and a single swarm separated into two or more swarms, by its use, and which shall be simple in construction and convenient in use.

The invention will first be described in connection with the drawing, and then pointed out in the claim.

A represents the body of the hive, which may be of any desired length, and of such a width and height as to contain comb-frames B of a convenient size. The bottom of the hive A inclines or slopes forward, and its side and rear edges are attached to the inner surface of the sides and back of the hive. The forward part of the sloping bottom is attached to and projects beneath the lower edge of the front of the hive, to serve as a platform for the bees to alight upon and take flight from.

In the lower edge of the front of the hive is formed a long shallow notch, which, when left open, in connection with the sloping bottom, enables the bees to readily remove all dirt and refuse from the hive. This long notch may be closed with a strip, $a'$, having two or three small openings or passages formed through it, and which, when inserted in the said notch, enables the bees to readily keep out robber bees and other intruders.

The inner sides of the upper edges of the front and rear sides of the hive A are rabbeted to receive the projecting ends of the top bars of the comb-frames B, the bottom bars of which are inclined to correspond with the incline or slope of the bottom of the hive.

C are wire-gauze screens, which are attached to frames similar in shape to the comb-frames B. D is the cover of the hive, which is detachable to give convenient access to the interior of the hive.

The cover D is made larger than the size of the hive A, and has downwardly-projecting flanges attached to the lower side of its edges, which overlap the outer sides of the top of the hive, to keep it in place and to prevent rain from beating into the hive. E is a wire-gauze screen, interposed between the cover D and the top bars of the comb-frames B, to prevent the bees from waxing the said top bars to the cover D.

To unite two swarms, they are put into the hive upon the opposite side of one of the screens C, the queen of one of the swarms being killed when they are put in. After twenty-four hours the intervening screen is removed, and the two swarms will unite and work together as one.

To divide a swarm, a comb-frame containing a comb with a queen-cell is removed with a number of old bees, and placed upon the other side of one of the screens C, and a new swarm is formed.

We are aware that the various parts of our bee-hive have been used separately in other hives, and we therefore do not claim them, broadly, by themselves. It is by combining the different elements in one hive, as described, that we are enabled to produce a bee-hive which has been found eminently practical for the purpose of dividing the bees into two colonies, or merge two colonies into one, as above stated, and also produce a hive that is self-cleaning, or, at least, one that the bees themselves can clean out.

Having thus described our invention, we claim as new and desire to secure by Letters Patent—

In a bee-hive, the combination of the body A, having its bottom inclined and provided with the removable notched bar $a'$ at the entrance, the comb-frames B B, adjustable and removable wire-gauze screens C C, the detachable cover D, and the wire-gauze screen E, interposed between the cover and the comb-frames, all arranged substantially as and for the purposes herein set forth.

BENJAMIN BUZZARD.
ANDREW P. SNYDER.

Witnesses:
G. W. WISE,
J. H. M. COMBS.